United States Patent [19]

Stager et al.

[11] 4,276,498

[45] Jun. 30, 1981

[54] ADJUSTABLE TORQUE CONTROL WINCH SYSTEM

[75] Inventors: Robert F. Stager; Graham J. Blight, both of Houston, Tex.

[73] Assignee: Brown & Root, Inc., Houston, Tex.

[21] Appl. No.: 858,962

[22] Filed: Dec. 9, 1977

[51] Int. Cl.³ ........................ B65H 77/00; H02P 7/06

[52] U.S. Cl. ........................................ 318/6; 318/432; 242/75.51

[58] Field of Search ................ 318/6, 432; 242/75.51; 310/94, 95

[56] References Cited

U.S. PATENT DOCUMENTS

| | | | |
|---|---|---|---|
| 2,607,908 | 8/1952 | Edwards et al. | 318/6 |
| 2,749,459 | 6/1956 | Williford, Jr. | 318/205 |
| 2,791,933 | 5/1957 | Crockett | 242/75.51 |
| 3,192,421 | 6/1965 | Saylor | 310/95 |

*Primary Examiner*—J. V. Truhe
*Assistant Examiner*—Eugene S. Indyk
*Attorney, Agent, or Firm*—Kenway & Jenney

[57] ABSTRACT

System for maintaining a preselected constant torque on a loaded reel of a winding mechanism. The system includes a d.c. motor wherein both the armature and field windings are adapted for independent rotation about a common axis. The field winding is coupled to the reel so that the reel rotates at a velocity proportional to that of the field winding. A drive motor establishes a constant speed rotation of the armature winding. A torque control drives constant currents through the armature and field windings of the motor. The amplitudes of the armature and field currents are preselected so that a constant torque is maintained at the reel irrespective of variations of the load.

6 Claims, 4 Drawing Figures

ADJUSTABLE TORQUE CONTROL WINCH SYSTEM

BACKGROUND OF THE DISCLOSURE

This invention relates to the field of winding mechanisms and more particularly to constant torque winches.

There are many applications for winding mechanisms which require the application of torque to a cable coupled to a time-varying load, where the torque amplitude is required to be relatively constant and independent of the winding speed of the mechanism. Such applications include, for example, pipe tensioners and constant tension winches. Another such application relates to the transfer of heavy loads at sea, for example, between two vessels, or between a vessel and a stationary platform, such as an off-shore oil drilling platform. Such transfers are extremely difficult in open sea environments, particularly during periods of relatively rough seas. Under these conditions, substantially constant torque must be maintained on the winch drum during load transfer operations in order to avoid breaking of the cables during sudden and large shifts of position between the vessels.

In the prior art, there have been several approaches to provide relatively constant torque winches. In one such approach, a single phase (a.c.) induction motor utilizes a non-excited squirrel cage rotor driven at constant speed and a stator driven with an alternating current of variable frequency in order to vary its speed and direction of rotation. While providing constant torque winding operation, this configuration is limited to relatively low power applications and requires relatively complex and correspondingly expensive components, both for the a.c. motor configuration and for the control circuitry.

In an alternative prior art approach, an eddy current electro brake configuration is used to drive a winding reel. The electro brake includes a rotor attached to the reel and has a coil driven by constant current, and further includes a stator driven at constant speed in which eddy currents are developed to absorb energy and brake the rotor. This configuration too has practical limitations due to power losses from heat buildup in the electro brake, and in addition, requires relatively complex and expensive motor and control circuit components.

It is an object of the present invention to provide a winding mechanism characterized by constant output torque.

Another object of the present invention is to provide a winding mechanism characterized by a preselected output torque determined by armature and field currents of a d.c. motor.

SUMMARY OF THE INVENTION

In accordance with the present invention, a drive motor is connected to a rotatably journalled shaft which includes an armature winding of a d.c. motor at one end. A drum, or reel, for winding and unwinding a loaded cable is journalled for rotation about the shaft in a surrounding relation to the armature. The reel contains field winding for the d.c. motor. The field winding is concentrically disposed about the armature and adapted for electromagnetic interaction with the armature. The drive motor rotates the shaft and armature winding at a predetermined angular velocity. A torque controller provides predetermined constant energizing currents to the armature and field windings so that the reel rotates about the shaft axis at an angular velocity sufficient to maintain a constant torque at the reel regardless of variations in the load coupled to the cable.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
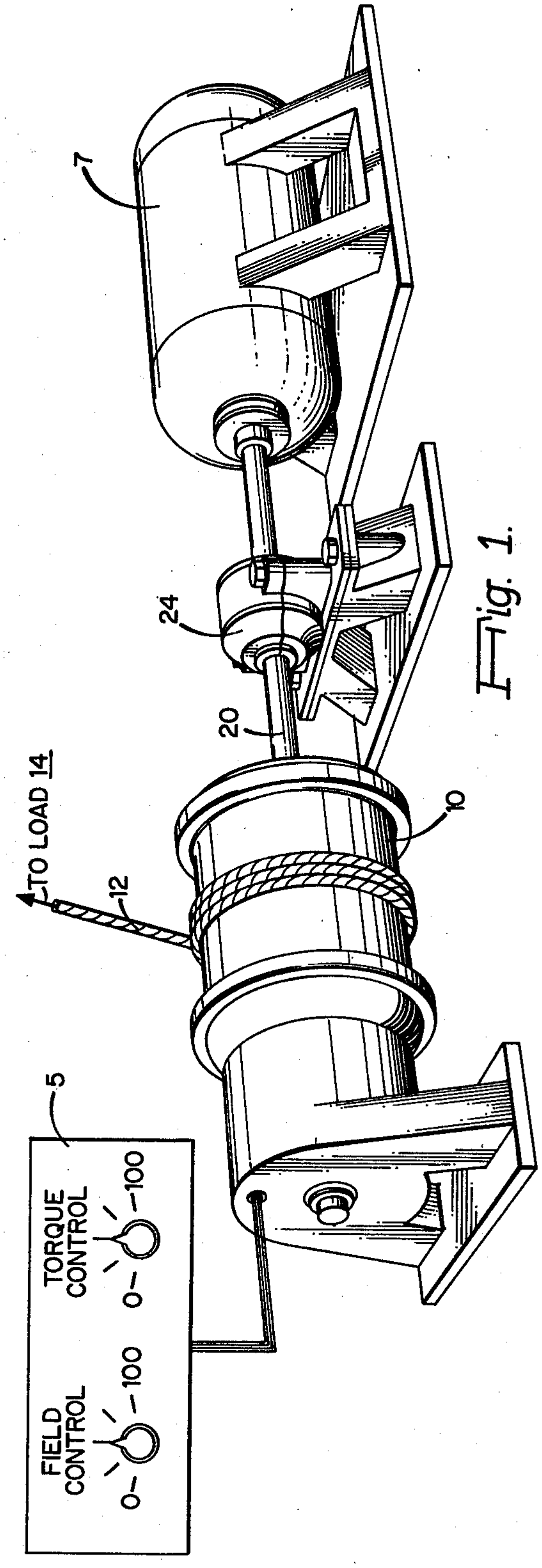
FIG. 1 shows an exemplary winch system in accordance with the present invention.

The present invention provides an adjustable torque controlled winding mechanism using a d.c. motor with the armature and field windings adapted for rotation about the d.c. motor axis. With this configuration, a preselected constant torque may be applied to a loaded drum coupled to the field windings as a result of the application of controlled constant currents to the armature and field windings. The torque, T, applied to the loaded drum equals:

$$T = K\phi I$$

where K is a constant determined by the number of poles on the field and the number and arrangement of conductors on the armature; $\phi$ is the total flux per pole crossing the air gap; and I is the armature current. When the flux is constant (by establishing constant field current), and the armature current is constant (by controlling the armature voltage), the torque applied to the loaded drum is constant.

FIGS. 1–4 show the preferred embodiment which includes a control 5, drive motor 7, winding reel 10 and d.c. motor 16. In those figures, the winding drum or reel 10 is shown with a cable 12 coupled to a load 14. The d.c. motor 16 is disposed within reel 10.

Figure 3:
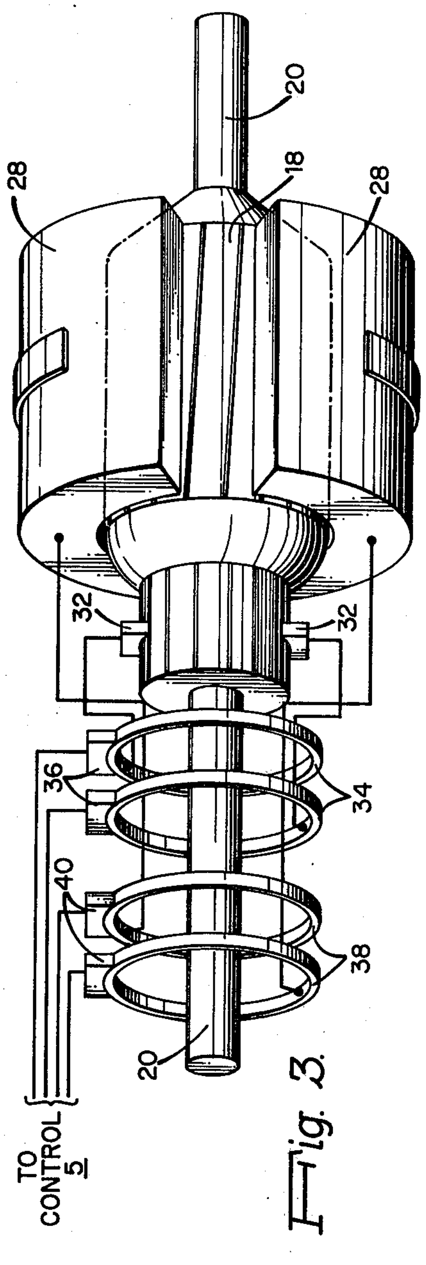
FIG. 3 shows in detailed form the d.c. motor of the system of FIG. 1.

The motor 16 is shown in detail in FIG. 3, and includes an armature winding 18 disposed on a shaft 20 which is journalled for rotation about an axis 22 by the pedestal bearing 24 and support bearing 26. The motor also includes field winding 28 disposed concentrically about the armature winding 18 and adapted for electromagnetic interaction with that winding. In the present embodiment, the field winding 28 is affixed to the interior of the reel 10 which in turn is journalled at bearings 29 and 30 for rotation about shaft 20. In other embodiments the field winding 28 may be wound on a support member which is otherwise coupled to the reel so that the angular velocity of the reel is proportional to the angular velocity of the field winding 28 about axis 22.

Figure 2:
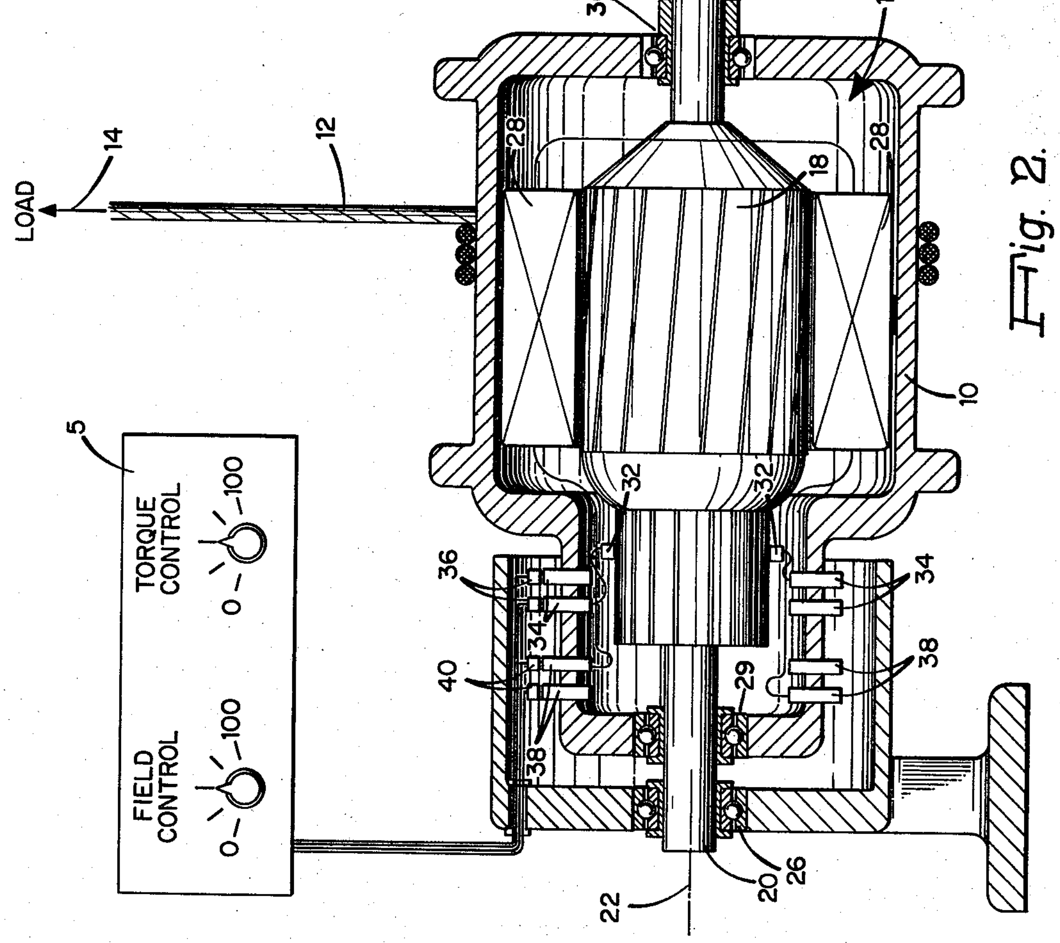
FIG. 2 shows a cut-away view of the winding reel and d.c. motor of the system of FIG. 1.

As shown in the detail of FIGS. 2 and 3, the armature winding 18 is electrically coupled to control 5 by way of armature brushes 32 and slip rings 34 and associated slip ring brushes 36. The field winding 28 is electrically coupled to control 5 by way of slip rings 38 and associated brushes 40.

Figure 4:
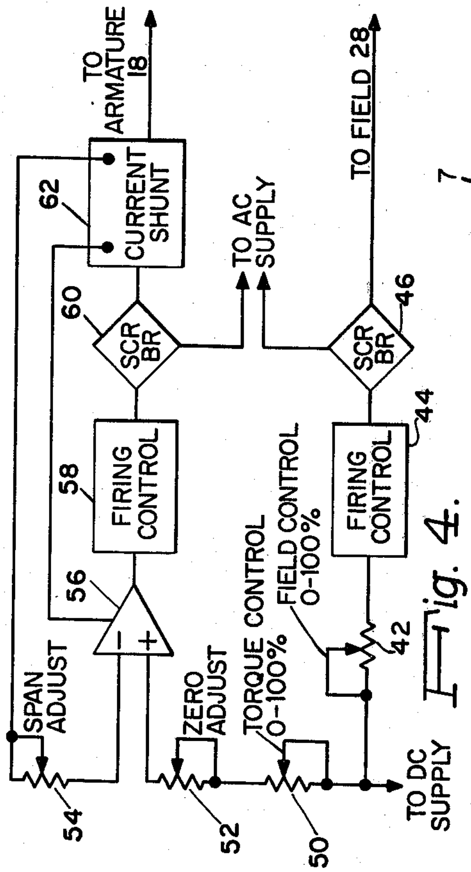
FIG. 4 shows in block diagram and schematic form the control of the system of FIG. 1.

FIG. 4 illustrates an exemplary configuration for the control 5 in block diagram form suitable for the present system.

As shown in that figure, the field control portion of control 5 includes field control potentiometer 42, firing control 44 and SCR bridge 46. In operation, the potentiometer 42 is set to a desired field level and the firing control 44 activates SCR bridge 46 to drive a constant current through the field winding 28.

The torque control portion of control 5 includes torque control potentiometer 50, zero adjust potentiometer 52, span adjust potentiometer 54, differential amplifier 56, firing control 58, SCR bridge 60 and current shunt 62. All of these elements are connected in a conventional manner to provide a drive voltage for the armature 18 so that the difference in the drive voltage and the back emf in armature 18 is a constant. In operation, potentiometer 50 and 52 are initially set to a desired torque level (primarily by potentiometer 50). With zero initial armature current, the voltage drop across the shunt 62 is zero and amplifier 56 provides an output voltage which causes control 58 to activate the SCR bridge 60 which in turn drives a current through shunt 62 to armature 18. The resultant voltage drop across shunt 62 is fed back to amplifier 56 by way of potentiometer 54 so that the armature current stabilizes at a constant value. Since the armature current is constant, and since it is well known that the drive voltage across the armature equals the back emf of the armature plus the product of the armature current and the resistance of the armature winding, the difference between the applied armature voltage and the back emf is a constant.

The shaft 20 is directly coupled to the drive motor 7 in the present embodiment. In other embodiments, any well known alternative mechanical coupling may be used.

In operation, the drive motor 7 is energized to rotate shaft 20 and armature 18 at a predetermined angular velocity about axis 22. The torque control 5 is then activated to provide a constant current through the field winding 28 to establish a constant flux in motor 16. The control 5 is then activated to provide a preselected constant current through the armature winding 18. Consequently, the loaded reel 10 rotates at an increasing speed until the applied torque reaches the predetermined value. Thereafter, the torque on reel 10 remains substantially constant. In the event of decreasing or increasing load on cable 12, the field winding and reel vary their rotational velocity in a compensating manner until the predetermined torque is again applied to reel 10. The response time of the system in achieving balance following a load perturbation is a function of the system element characteristics.

Accordingly, with the relatively low power requirements of a d.c. motor shunt field, which in turn controls the armature current, the configuration of this invention avoids the power restrictions associated with the prior art low-voltage accelerator drives, and provides finite torque control from zero to maximum over the full-speed range of the drive.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. System for maintaining a torque having a constant amplitude and direction on a load coupled to the reel of a winding mechanism, comprising:

A. a d.c. motor including:
   i. an armature winding disposed on a shaft, and
   ii. a field winding disposed concentrically about said armature winding on a supporting member, and adapted for electromagnetic interaction with said armature winding, B. means for rotatably journaling said supporting member with respect to said shaft, C. means for coupling said supporting member and said reel so that the angular velocity of said reel about its rotational axis is proportional to the angular velocity of said supporting member about said shaft axis, D. means for rotating said shaft about its axis at a predetermined angular velocity, and E. torque control means for driving a first selected constant current through said field winding and a second selected constant current through said armature winding for maintaining said constant amplitude and direction torque on said load independent of the rotational speed magnitude and direction of said supporting member, whereby said reel is driven by said supporting member to rotate about said reel axis at an angular velocity required to maintain said constant torque on said load.

2. Apparatus according to claim 1 wherein said reel and said shaft are coaxial.

3. Apparatus according to claim 2 wherein said supporting member is attached to an interior surface of said reel.

4. Apparatus according to claim 1 wherein said means for energizing said armature winding includes means for applying a drive voltage across said armature winding, said drive voltage being related to the back emf in said armature winding so that the difference in said drive voltage and said back emf is a constant.

5. Apparatus according to claim 4 wherein said reel and said shaft are coaxial.

6. Apparatus according to claim 5 wherein said supporting member is attached to an interior surface of said reel.

* * * * *